(12) United States Patent
Lu et al.

(10) Patent No.: US 11,308,985 B2
(45) Date of Patent: Apr. 19, 2022

(54) FLUOROPOLYETHER COMPOUND AND LUBRICANT

(71) Applicant: Seagate Technology LLC, Cupertino, CA (US)

(72) Inventors: Yu Lu, Milpitas, CA (US); JiPing Yang, San Jose, CA (US); Jingyuan Zhuo, Fremont, CA (US); Qian Guo, Fremont, CA (US); Wen Liu, San Jose, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 587 days.

(21) Appl. No.: 16/260,692

(22) Filed: Jan. 29, 2019

(65) Prior Publication Data

US 2019/0237101 A1    Aug. 1, 2019

Related U.S. Application Data

(60) Provisional application No. 62/623,307, filed on Jan. 29, 2018.

(51) Int. Cl.
| | | |
|---|---|---|
| *G11B 5/725* | (2006.01) | |
| *C10M 107/32* | (2006.01) | |
| *C08L 71/02* | (2006.01) | |
| *C10M 107/38* | (2006.01) | |
| *C10N 40/18* | (2006.01) | |
| *C10N 50/00* | (2006.01) | |

(52) U.S. Cl.
CPC ............. *G11B 5/725* (2013.01); *C08L 71/02* (2013.01); *C10M 107/32* (2013.01); *C10M 107/38* (2013.01); *C08L 2203/20* (2013.01); *C10M 2213/04* (2013.01); *C10M 2213/06* (2013.01); *C10M 2213/0606* (2013.01); *C10N 2040/18* (2013.01); *C10N 2050/023* (2020.05)

(58) Field of Classification Search
CPC ...... G11B 5/725; C08L 71/02; C08L 2203/20; C10M 2213/04; C10M 2213/06; C10M 2213/0606; C10M 107/32; C10M 107/38; C10N 2040/18; C10N 2050/023
See application file for complete search history.

(56) References Cited

U.S. PATENT DOCUMENTS

| | | |
|---|---|---|
| 9,177,586 B2 | 11/2015 | Shimokawa |
| 9,245,568 B2 * | 1/2016 | Itoh ..................... G11B 5/8408 |
| 9,805,755 B1 | 10/2017 | Yang |
| 2010/0035083 A1 | 2/2010 | Yang |

(Continued)

FOREIGN PATENT DOCUMENTS

JP    2010143855    7/2010

OTHER PUBLICATIONS

Chiba, et al., "Tribological Characteristics of Newly Synthesized Multi-Functional PFPE Lubricants," World Tribology Congress III, vol. 1, Washington, D.C., USA, Sep. 2005, 2 pages.

*Primary Examiner* — Holly Rickman
(74) *Attorney, Agent, or Firm* — Holzer Patel Drennan

(57) ABSTRACT

Fluoropolyether compounds that can be used as a lubricant, such as for magnetic recording media. The compounds have a terminal group that includes a phenol or benzene. The fluoropolyether compounds reduce the head to media distance while keeping comparable reliability in a hard disk drive compared to current industrial widely used fluoropolyether based lubricants.

13 Claims, 7 Drawing Sheets

(56) References Cited

U.S. PATENT DOCUMENTS

| | | |
|---|---|---|
| 2010/0261039 A1 | 10/2010 | Itoh et al. |
| 2011/0117386 A1 | 5/2011 | Li |
| 2012/0295134 A1 | 11/2012 | Wakabayashi et al. |
| 2013/0209837 A1 | 8/2013 | Sagata et al. |
| 2014/0141284 A1 | 5/2014 | Yang et al. |
| 2015/0371672 A1 | 12/2015 | Sagata |
| 2017/0152456 A1 | 6/2017 | Sagata et al. |
| 2017/0260472 A1 | 9/2017 | Sagata |
| 2017/0365287 A1 | 12/2017 | Yang |

\* cited by examiner

FLUOROPOLYETHER COMPOUND AND LUBRICANT

CROSS-REFERENCE

The present application claims priority to U.S. provisional application 62/623,307 filed Jan. 29, 2018, the entire disclosure of which is incorporated herein by reference for all purposes.

BACKGROUND

High-performance lubricants are used in a large number of diverse applications. The requirements for these lubricants are becoming more demanding due to a variety of factors, including increased miniaturization of electronic and mechanical devices, higher-temperature operating conditions, increased expectations for product lifetimes, and expanded ranges of operating and storage environments.

One application in which high-performance lubricants are subject to ever-increasing demands is in magnetic recording apparatuses such as hard disk drives. Some lubricants for hard disk drives include perfluoropolyethers. There remains, however, a need for optimizing lubricants, such as perfluoropolyethers (PFPEs), to meet ever-increasing demands.

SUMMARY

This disclosure is directed to fluoropolyether compounds that can be used as a lubricant, such as for magnetic recording media. The fluoropolyether compounds reduce the head to media distance while keeping comparable reliability in the hard disk drive compared to current industrial widely used fluoropolyether based lubricants.

The present disclosure provides fluoropolyether compounds of formula (1):

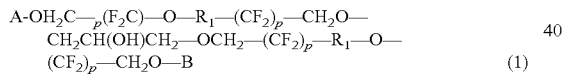

where:

$R_1$ is $-(CF_2O)_x(CF_2CF_2O)_y(CF_2CF_2CF_2O)_z(CF_2CF_2CF_2CF_2O)_w-$;

x and y are integers within the range of 0 to 30;

z and w are integers within the range of 0 to 20;

p is an integer within the range of 0 and 4; and

A and B is each a group represented by formula (2):

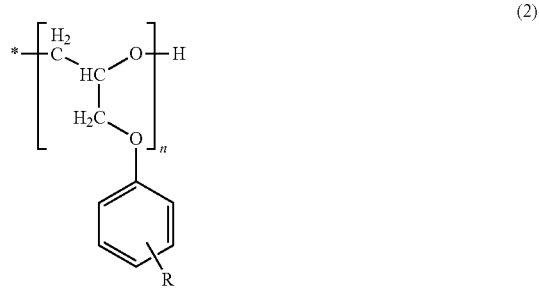

where:

R is a hydrogen, a $C_{1-10}$ alky group, or an alkoxy group; and n is 1 or 2.

The fluoropolyether compound can be used as a lubricant on media, such as magnetic media, such as a disk. In some implementations, two or more compounds may be present in the lubricant.

The present disclosure also provides an apparatus, such as a magnetic recording medium, having the fluoropolyether compound present in a lubricant layer thereon.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

The present description provides fluoropolyether compounds that are suitable for use as lubricants for media, such as magnetic media. The fluoropolyether compounds of this disclosure can help reduce the head to media distance while keeping comparable reliability in a hard disk drive compared to current industrial widely used fluoropolyether based lubricants.

The compounds of this disclosure are of formula (1):

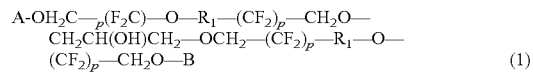

where:

$R_1$ is $-(CF_2O)_x(CF_2CF_2O)_y(CF_2CF_2CF_2O)_z(CF_2CF_2CF_2CF_2O)_w-$;

x and y are integers within the range of 0 to 30;

z and w are integers within the range of 0 to 20;

p is an integer within the range of 0 and 4; and

A and B is each a group represented by formula (2):

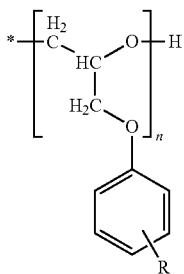 (2)

where:

R is a hydrogen, a $C_{1\text{-}10}$ alky group, or an alkoxy group; and n is 1 or 2.

For x and y, x and y are independently integers, e.g., within the range of 0 to 20. Also for z and w, z and w are independently integers. By use of the term "independently," it is intended that x and y may be the same or different integers, and that z and w may be the same or different integers.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Figure 1:
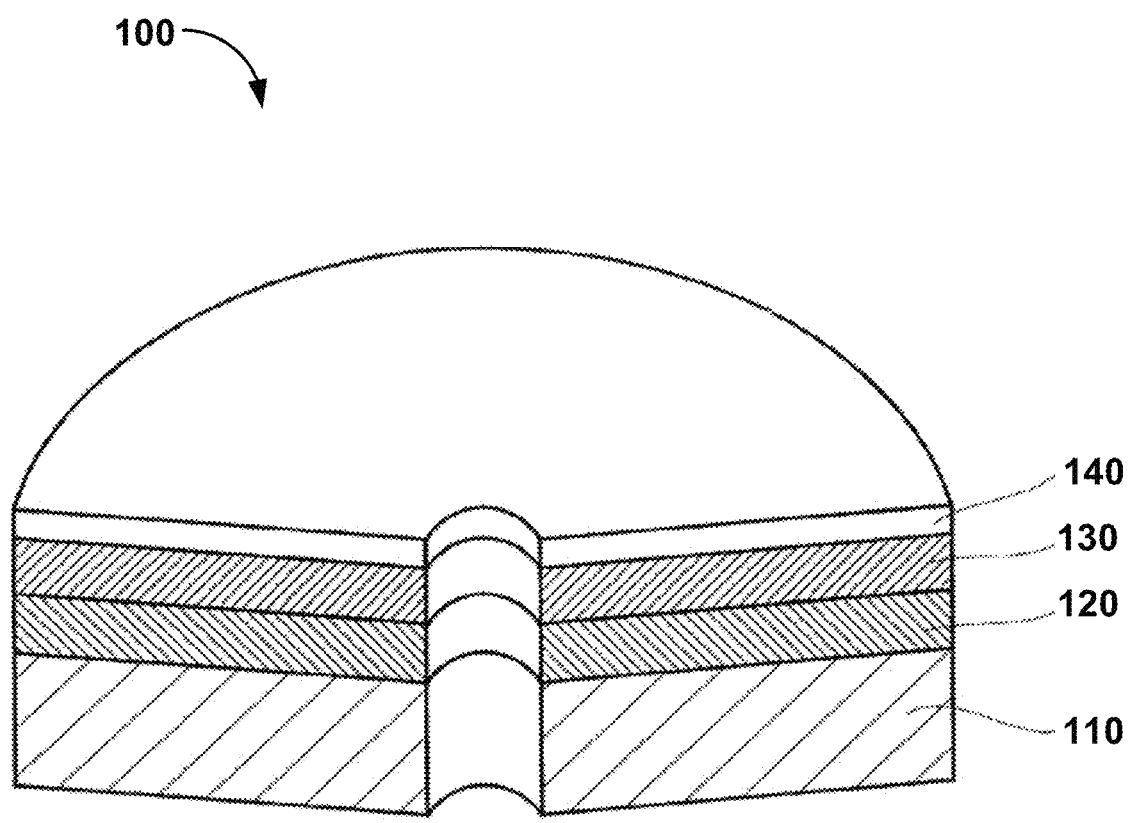
FIG. 1 is a schematic partial cross-section, perspective view of a magnetic medium.

FIG. 1 provides a schematic partially cross-section, perspective view showing the layers of a storage medium 100 including a substrate 110, a magnetic layer 120, a protective layer 130, and a lubricant layer 140. The initial layer of the medium structure is the substrate 110, which may be, e.g., a nickel-phosphorous-plated aluminum or glass disk. The magnetic layer 120 may be, e.g., a thin film deposited on top of the substrate 110, and may be a magnetic alloy including any or all of cobalt (Co), platinum (Pt), and chromium (Cr). The magnetic layer 120 may have a thickness of about 500 Angstrom over the substrate 110. A seed layer (not shown) may be positioned on the substrate 110 to enhance the adhesion of the magnetic layer 120 to the substrate 110. The seed layer may be a thin film, e.g., chromium.

The protective layer 130 is a thin film present on, e.g., deposited on, the magnetic layer 120. The protective layer 130 may be a diamond-like carbon ("DLC") layer, which exhibits properties between those of graphite and diamond. The DLC layer may be deposited using thin film deposition techniques such as one or more thin film deposition techniques selected from ion beam deposition (IBD), plasma enhanced chemical vapor deposition (PECVD), magnetron sputtering, radio frequency sputtering, and chemical vapor deposition (CVD). During the deposition process, adjustment of the sputtering gas mixtures of argon and hydrogen varies the concentrations of hydrogen found in the DLC. In some implementations, the protective layer 130 is about 150 Angstrom thick, although in other implementations the protective layer 130 is less than 150 Angstrom thick, such as less than 100 Angstrom thick.

The lubricant layer 140, which includes one or more fluoropolyether compounds according to this disclosure, are deposited or coated on top of the protective layer 130 for added protection, lubrication, and enhanced disk drive reliability. The lubricant layer 140 reduces wear and damage caused by occasional contacts of the magnetic head assembly (not shown in FIG. 1, but well known) with the storage medium 100.

Organic contaminants and other contaminants are known to compromise the head-to-storage media interface reliability if adsorbed onto the storage medium surface and/or accumulated (e.g., as droplets) onto the magnetic head assembly. One function of the lubricant layer 140 is to provide an inert barrier film to block adsorption of any contaminants that might be present in the disk drive (e.g., due to outgassing from other drive internal components).

The durability and reliability of the storage medium 100 is achieved primarily by the application of the protective layer 130 and the lubricant layer 140. As the thickness of the protective layer 130 and the lubricant layer 140 is reduced, greater integration at the interface of the protective layer 130 and the lubricant layer 140 is needed to provide more durable protection for the medium 100.

With respect to the methods, the methods for lubricating apparatuses such as storage medium 100 may include applying the lubricant layer 140 over a surface to be lubricated, such as the protective layer 130, whether DLC or other. The lubricant layer 140 may be formed using a lubricant including one or more compounds of this disclosure, which one or more compounds may form the lubricant either wholly or in part. In other words, the lubricant layer 140 can include more than one fluoropolyether compound of this disclosure.

The lubricant layer such as lubricant layer 140 may be applied evenly as a thin film having a thickness from about 5 Angstrom to about 50 Angstrom, including from about 8 Angstrom to about 40 Angstrom, for example, from about 10 Angstrom to about 20 Angstrom. The lubricant layer 140 may be made as thin as possible while maintaining its characteristics related to storage media durability and slider flyability. The selection of the thickness of the lubricant layer may depend on interactions between the storage medium and the magnetic head assembly, which interactions include the static friction or "stiction" force on the slider, air shear, and/or the tendency of the lubricant to evaporate. In general, the thickness of the lubricant layer 140 is desired to be as thin as possible, to decrease the fly height, however in some implementations, the lubricant layer 140 is sufficiently thick so that the coating is continuous with no bare spots present.

Fluoropolyether compounds according to the present disclosure can be prepared using the following method:

Step 1: A fluoropolyether having hydroxyl groups (e.g., Fomblin® Zdol from Solvay) at both ends is reacted with a phenoxy compound having an epoxy group (e.g., 1,2-epoxy-3-phenoxypropane) in a solvent (e.g., t-butanol) in the presence of catalyst (e.g., potassium t-butoxide) at a temperature of 40-80° C.; in some implementations, a temperature of 65° C. is used. Subsequently, e.g., after 24 hours, the reaction mixture is neutralized, e.g., by 1 M HCl, and washed, e.g., with 10% acetone in water (e.g., three times) and dried by air. The mixture is separated by distillation, column chromatography or supercritical fluid extraction (SFE), and the resulting fluoropolyether, having one hydroxyl at one terminal and one group A (formula 2) at the opposite terminal is collected.

Step 2: The collected fluoropolyether from Step 1, with one hydroxyl at one terminal and one group A at the opposite terminal, is reacted with epichlorohydrin in a solvent (e.g., t-butanol) in the presence of a base (e.g., potassium t-butoxide) at a temperature of 40-80° C.; in some implementations, a temperature of 65° C. is used. Subsequently, e.g., after 48 hours, the reaction mixture is neutralized, e.g., by 1 M HCl, and washed 10% acetone in water (e.g., three times) and dried by air. The mixture is separated by distillation, column chromatography or supercritical fluid extraction (SFE). The final product with formula (1) is collected.

The following examples of fluoropolyether compounds according to the present disclosure were prepared.

EXAMPLE 1

Perfluoropolyether Fomblin® Zdol (from Solvay)

Figure 2:
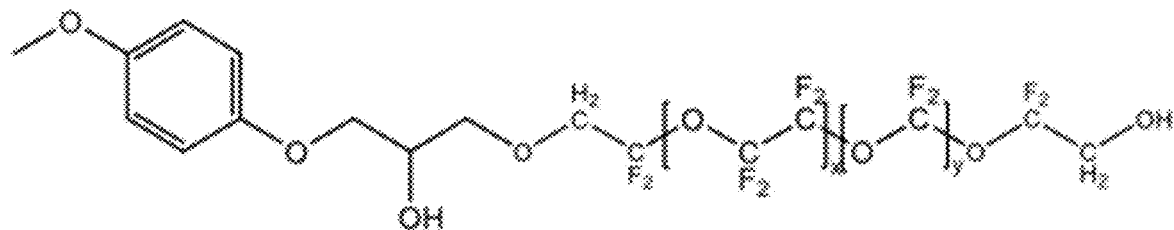
FIG. 2 is the molecular structure for structure (a).

$(HOCH_2CF_2(OCF_2CF_2)_x(OCF_2)_yOCF_2CH_2OH$, where x and y are integers of 0 to 20; Mw~2000, 100 g, 0.05 mol) and potassium t-butoxide (0.56 g, 0.005 mol) were dissolved in 100 g t-butanol at 65° C. After 0.5 hours, glycidyl 4-methoxyphenyl ether (9.01 g, 0.05 mol) was added into the solution. After 24 hours, the reaction was stopped. The mixture was neutralized by 1 M HCl and washed three times with 10% acetone in DI water. After completely drying by air blowing, the mixture was separated by SFE. The component with structure (a), shown in FIG. 2, was collected.

Figure 3:
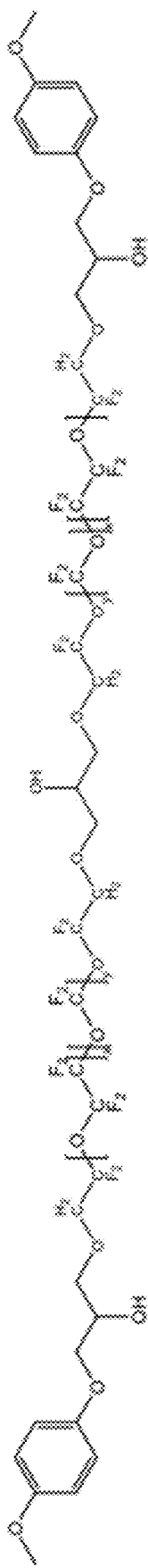
FIG. 3 is the molecular structure for structure (b).

The fluoropolyether with structure (a) (Mw ~2180, 100 g, 0.046 mol) and potassium t-butoxide (2.57 g, 0.0229 mol) were dissolved in 100 g t-butanol at 65° C. After 30 minutes, epichlorohydrin (1.91 g, 0.0206 mol) was added dropwise into the solution. After three days, the reaction was stopped. The mixture was neutralized by 1 M HCl and washed three times with 10% acetone in DI water. After completely drying by air blowing, the mixture was separated by SFE. The component with structure (b), shown in FIG. 3, was collected.

This resulting compound can be used alone as a lubricant or as component in a lubricant.

EXAMPLE 2

Figure 4:
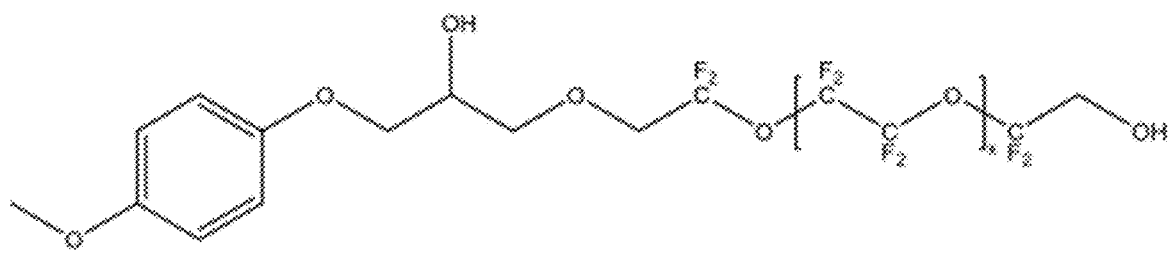
FIG. 4 is the molecular structure for structure (c).

Fluoro-polyethylene glycol (fPEG) $(HOCH_2CF_2(OCF_2CF_2)_xOCF_2CH_2OH$, where x is an integer 0 to 20; $M_w$~1250, 100 g, 0.08 mol) and potassium t-butoxide (0.9 g, 0.005 mol) were dissolved in 100 g t-Butanol at 65° C. After 0.5 hrs, glycidyl 4-methoxyphenyl ether (9.01 g, 0.05 mol) was added into the solution. After 24 hrs, the reaction was stopped. The mixture was neutralized by 1 M HCl and washed three times with 10% Acetone in DI water. After completely drying by air blowing, the mixture was separated by SFE. The component with structure (c), shown in FIG. 4, was collected.

Figure 5:
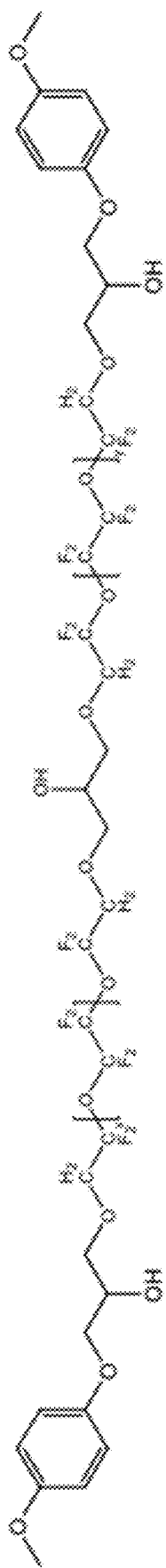
FIG. 5 is the molecular structure for structure (d).

The fluoropolyether with structure (c) (Mw ~1430, 100 g, 0.046 mol) and potassium t-butoxide (2.57 g, 0.0229 mol) were dissolved in 100 g t-butanol at 65° C. After 30 minutes, epichlorohydrin (1.91 g, 0.0206 mol) was added dropwise into the solution. After three days, the reaction was stopped. The mixture was neutralized by 1 M HCl and washed three times with 10% Acetone in DI water. After completely drying by air blowing, the mixture was separated by SFE. The component with structure (d), shown in FIG. 5, was collected.

This resulting compound can be used alone as a lubricant or as component in a lubricant.

EXAMPLE 3

Figure 6:
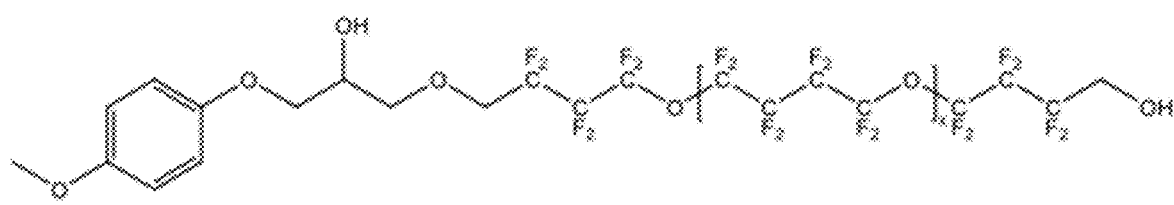
FIG. 6 is the molecular structure for structure (e).

FPTMEG $(HOCH_2CF_2(OCF_2CF_2CF_2CF_2)_xCF_2CH_2OH$, where x is an integer 0 to 20; Mw ~1300, 100 g, 0.076 mol) and potassium t-butoxide (0.86 g, 0.008 mol) were dissolved in 100 g t-butanol at 65° C. After 0.5 hrs, glycidyl 4-methoxyphenyl ether (13.86 g, 0.0769 mol) was added into the solution. After 24 hrs, the reaction was stopped. The mixture was neutralized by 1 M HCl and washed three times with 10% acetone in DI water. After completely drying by air blowing, the mixture was separated by SFE. The component with structure (e), shown in FIG. 6, was collected.

Figure 7:
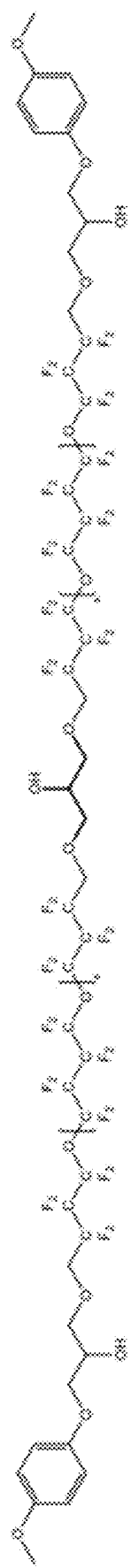
FIG. 7 is the molecular structure for structure (f).

The fluoropolyether with structure (e) (Mw ~1480, 100 g, 0.068 mol) and potassium t-butoxide (3.79 g, 0.034 mol) were dissolved in 100 g t-Butanol at 65° C. After 30 minutes, epichlorohydrin (2.81 g, 0.030 mol) was added dropwise into the solution. After three days, the reaction was stopped. The mixture was neutralized by 1 M HCl and washed three times with 10% Acetone in DI water. After completely drying by air blowing, the mixture was separated by SFE. The component with structure (f), shown in FIG. 7, was collected.

This structure (f) had the following 19FNMR (fluorine 19 nuclear magnetic resonance), when tested with acetone-d6:

$\delta$=−84.1 ppm (18F, —OC$\underline{F}$2CF2CF2C$\underline{F}$2O—; —OCF2CF2CF2CH2OCH2CHOHCH2OC6H4OC$\underline{H}$3)

$\delta$=−120.93 ppm (8F, —OCF2CF2C$\underline{F}$2CH2OCH2-CHOHCH2OC6H4OCH3; —OCF2CF2C$\underline{F}$2CH2OCH2C-HOHCH2OCH2C$\underline{F}$2CF2CF2O—)

$\delta$=−126.56 ppm (10F, —OCF2C$\underline{F}$2C$\underline{F}$2CF2O—)

$\delta$=−127.61 ppm (8F, —OCF2C$\underline{F}$2CF2CH2OCH2-CHOHCH2OC6H4OCH3; —OCF2C$\underline{F}$2CF2CH2OCH2C-HOHCH2OCH2C$\underline{F}$2CF2O—)

The structure (f) also had:

GPC: Mn=1913 g/mol (using polystyrene as a reference); Polydispersity index=1.01; and Lc-MS: (M+NH$^{+4}$): 1622.21, 1838.19, 2054.17, 2270.15.

This resulting compound can be used alone as a lubricant or as component in a lubricant.

The compound was compared to a commercially available lubricant commonly used for hard disks, specifically, that available from Moresco under the trade designation "D-4OH."

Figure 8:
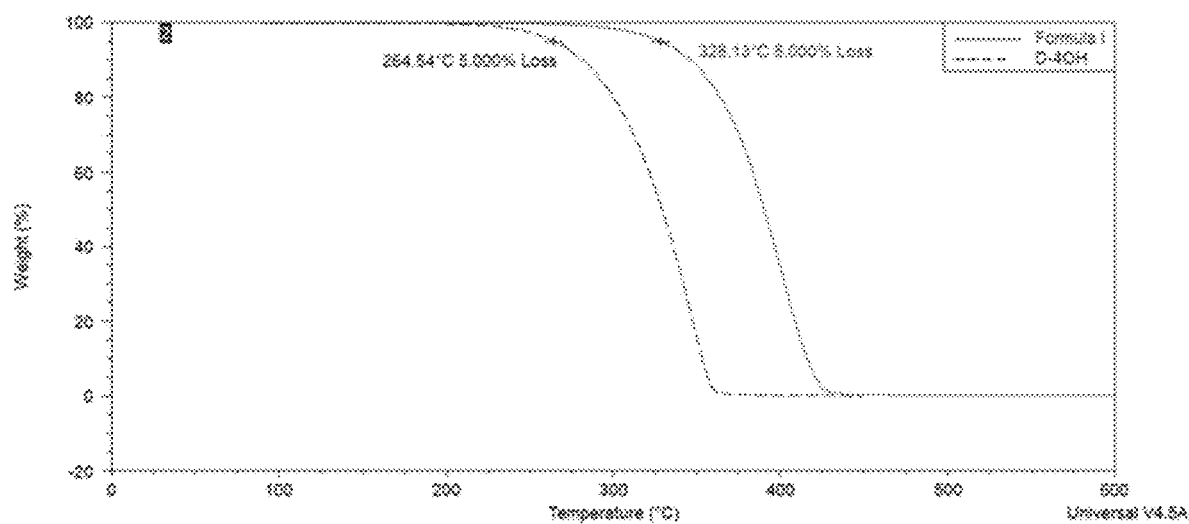
FIG. 8 is a graph showing TGA analysis of structure (f) compared to a conventional lubricant.

Thermogravimetric analysis (TGA) was used to gauge the thermal stability of the lubricant, specifically, the potential lube loss during drive operation. The TGA analysis was performed on a TA Instrument "TGA Q5000" using a 100 µl platinum pan and nitrogen purging gas. The sample size was 10 mg. The sample was heated to 600° C. at a heating rate of 5 degree/min. The 5% weight loss temperature was used for measuring potential lube loss. FIG. 8 shows that the lubricant with structure (f) (identified as Formula I in FIG. 8) had a 5% weight loss temperature of 328.13° C. while D-4OH had a 5% weight loss temperature of 264.54° C. The lubricant with structure (f) had much better thermal stability then D-4OH.

Figure 9:
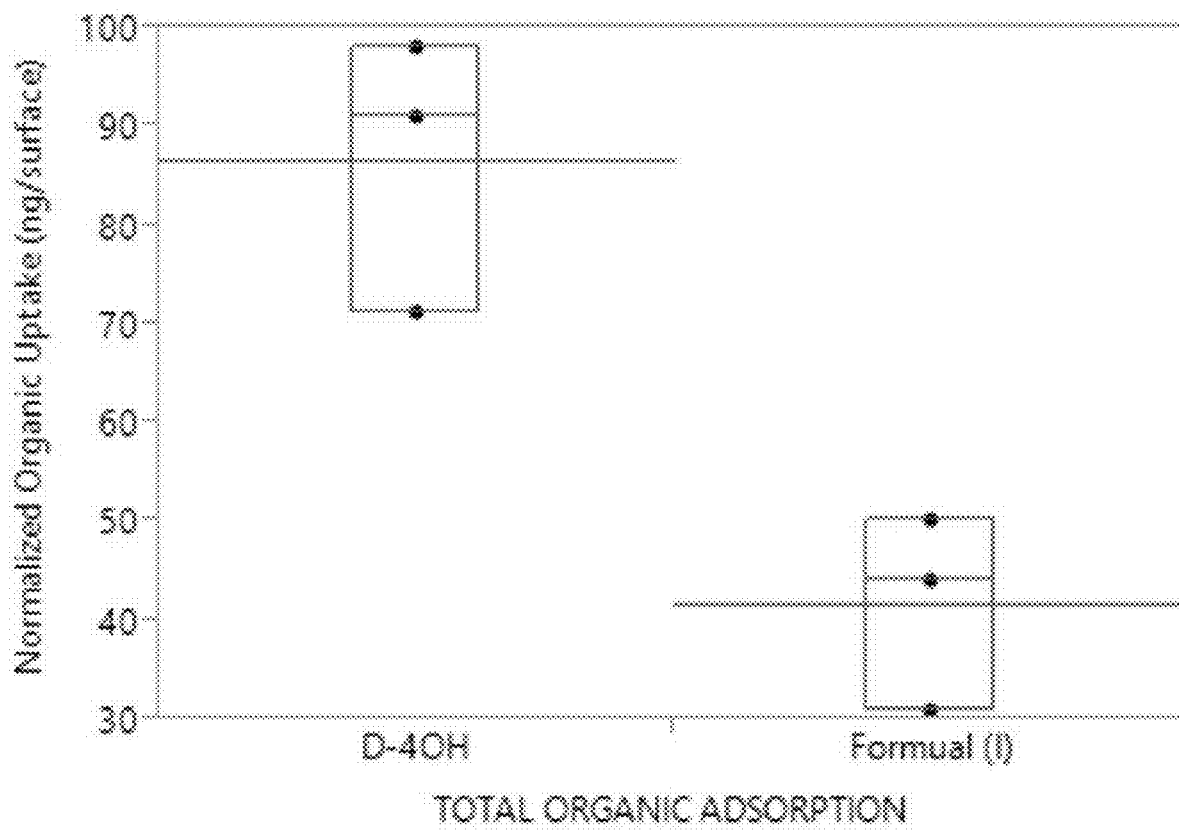
FIG. 9 is a graph showing total organic adsorption for structure (f) compared to a conventional lubricant.

The lubricant with structure (f) was further compared to Moresco D-4OH for contamination pick-up. FIG. 9 shows the comparison of total organic adsorption for the conventional lubricant (D-4OH) and the lubricant with structure (f) (identified as Formula I in FIG. 9).

Organic contaminants such as hydrocarbons are known to compromise the head-to-storage media interface reliability by adsorption onto the storage media surface and subsequent accumulation onto the read-write head. (e.g., as droplets). One function of a lubricant is to provide an inert barrier film to block adsorption of any contaminants that might be present in the disk drive (e.g., due to outgassing from other drive internal components).

Data such as that in FIG. 9 is collected by exposing media coated with different lubricants to model organic contaminants at elevated temperature in a closed system, followed by extraction and quantification of the amount adsorbed. As seen in FIG. 9, the lubricants including structure (f) (identified as Formula I in FIG. 9) showed a significant reduction in the level of adsorbed contamination as compared to the conventional lubricant.

Figure 10:
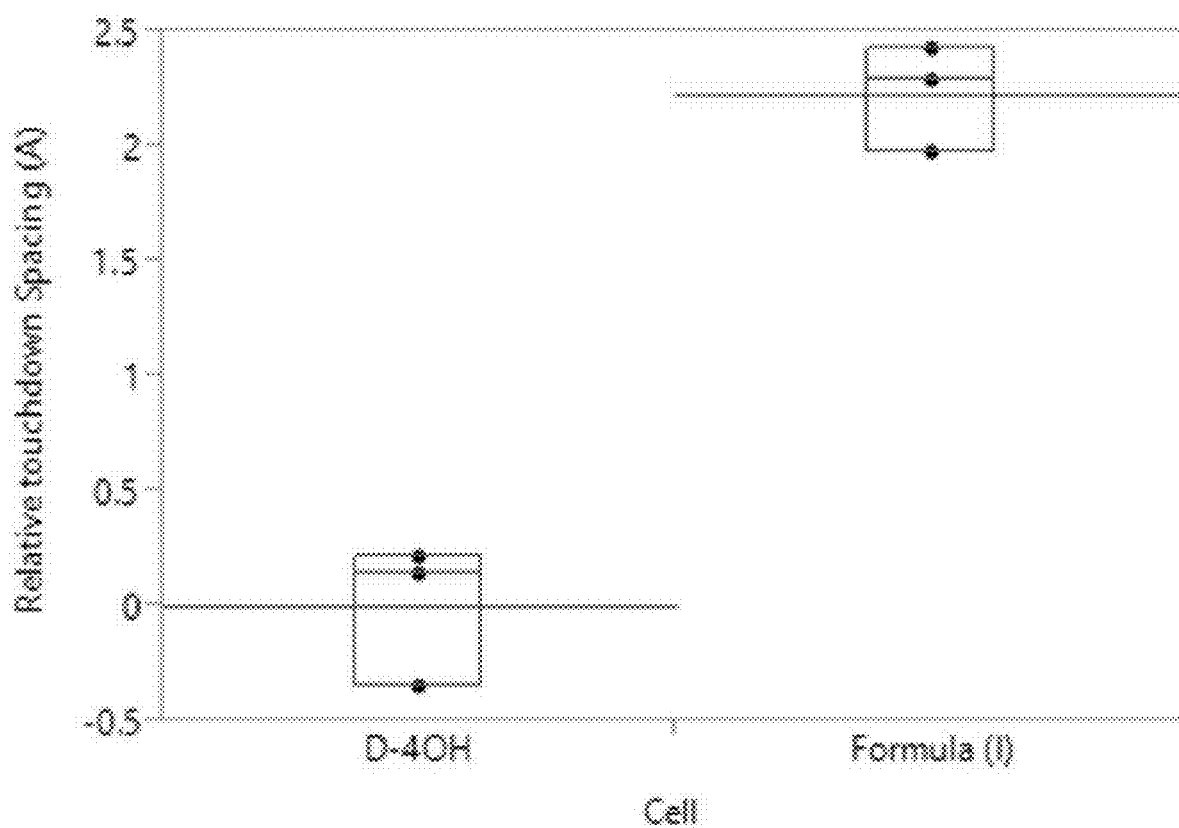
FIG. 10 is a graph shown relative touchdown spacing for structure (f) compared to a conventional lubricant.

The lubricant with structure (f) was also compared to Moresco D-4OH for touchdown clearance. FIG. 10 shows the comparison of relative touchdown spacing for a flying head above a surface with a conventional lubricant (D-4OH) and a surface with a lubricant including structure (f) (identified as Formula I in FIG. 10).

Touchdown spacing may be described as the distance between the lowest point of the magnetic head assembly (while flying) and the top of the lubricant surface. As seen in FIG. 10, the touchdown spacing of a storage medium using a lubricant including structure (f) (identified as Formula I in FIG. 10) results in more distance between the head and lubricant surface for a given HMS than D-4OH, thus reducing head-disk interactions and promoting disk drive reliability. The spacing for the conventional lubricant D-4OH was arbitrarily set to zero to show the measured difference in clearance.

The touchdown spacing is measured using an adaptive fly height head to protrude the close point of the head (keeping the flying height constant) until it touches the top of the lubricant layer, with contact determined by an increase in the acoustical emission signal from a sensor on the head. The same head may be used to measure different lubricants, which keeps the flying height constant and allows measurement of the difference in clearance between the lubricants.

EXAMPLE 4

Figure 11:
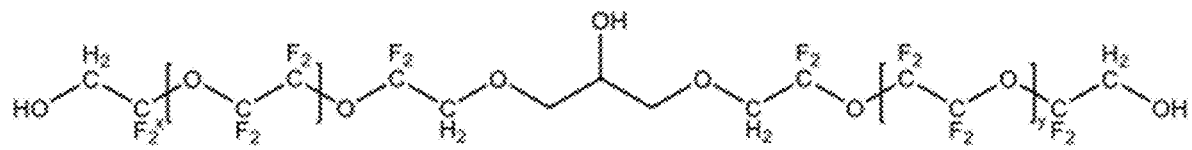
FIG. 11 is the molecular structure for structure (g).

Fluoro-polyethylene glycol (fPEG) (HOCH$_2$CF$_2$(OCF$_2$CF$_2$)$_x$OCF$_2$CH$_2$OH, where x is an integer 0 to 20; M$_w$~1250, 100 g, 0.08 mol) and potassium t-butoxide (4.49 g, 0.04 mol) were dissolved in 100 g t-butanol at 65° C. After 30 minutes, epichlorohydrin (2.59 g, 0.0280 mol) was added dropwise into the solution. After 72 hrs, the reaction was stopped. The mixture was neutralized by 1 M HCl and washed three times with 10% Acetone in DI water. After completely drying by air blowing, the mixture was separated by SFE. The component with structure (g), shown in FIG. 11, was collected.

This resulting compound can be used alone as a lubricant or as component in a lubricant.

Figure 12:
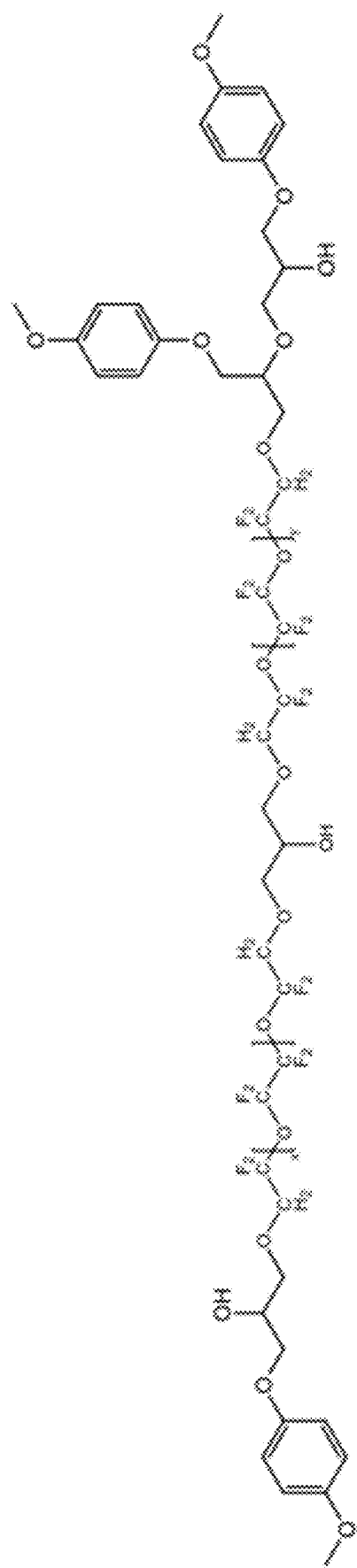
FIG. 12 is the molecular structure for structure (h).
Figure 13:
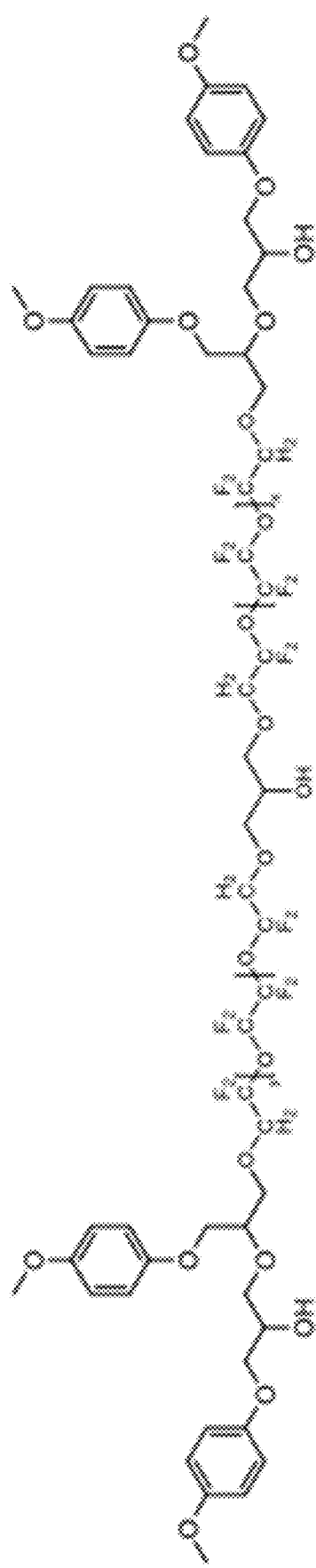
FIG. 13 is the molecular structure for structure (i).

The fluoropolyether with structure (g) (Mw ~2600, 100 g, and potassium t-butoxide (0.43 g, 0.004 mol) were dissolved in 100 g t-Butanol at 65° C. After 0.5 hrs, glycidyl 4-methoxyphenyl ether (20.79 g, 0.115 mol) was added into the solution. After 48 hrs, the reaction was stopped. The mixture was neutralized by 1 M HCl and washed three times with 10% Acetone in DI water. After completely drying by air blowing, the mixture was separated by SFE. The components with structures (d), (h) and (i) (shown in FIGS. 5, 12 and 13, respectively) were collected together or individually.

These resulting compounds can be used individually or together in any combination as components in lubricant.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A fluoropolyether compound having the formula (1):

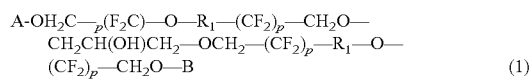

where:
R$_1$ is —(CF$_2$O)$_x$(CF$_2$CF$_2$O)$_y$(CF$_2$CF$_2$CF$_2$O)$_z$(CF$_2$CF$_2$CF$_2$CF$_2$O)$_w$—, with x=4, y=0 and w=0;
p is any integer within the range of 0 to 4; and
A and B are independently represented by formula (2):

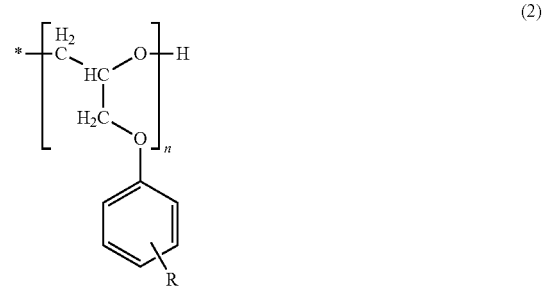

where:
R is a C$_{1-10}$ alkyl group, or an alkoxy group; and
n is 1 or 2.

2. The compound of claim 1 wherein A and B are the same.

3. The compound of claim 1 wherein A and B are different.

4. The compound of claim 1 wherein R is an alkoxy group and n=1.

5. A magnetic media comprising:
a substrate with a recording layer thereon, and a lubricant on the recording layer, the lubricant comprising a compound of claim 1.

6. The magnetic media of claim 5, wherein the lubricant comprises more than one compound of claim 1.

7. The magnetic media of claim 5, further comprising a protective layer on the recording layer, and the lubricant on the protective layer.

8. An apparatus comprising:
a substrate;
a magnetic layer on the substrate for magnetic recording
a protective overcoat layer protecting the magnetic layer; and
a lubricant layer over the protective overcoat layer, the lubricant comprising a compound of formula (1):

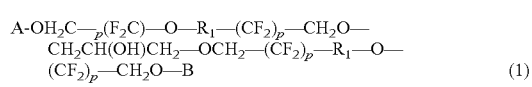

where:

$R_1$ is $-(CF_2O)_x(CF_2CF_2O)_y(CF_2CF_2CF_2O)_z(CF_2CF_2CF_2CF_2O)_w-$, with x=4, y=0 and w=0;

p is any integer within the range of 0 to 4; and

A and B are independently represented by formula (2):

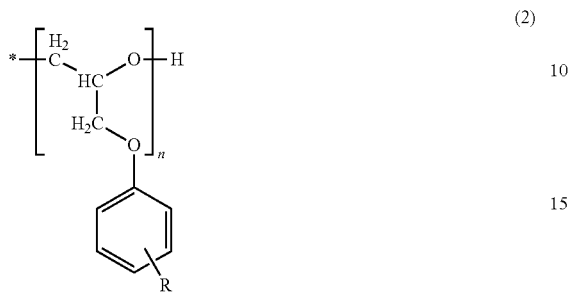

(2)

where:

R is a $C_{1-10}$ alkyl group, or an alkoxy group; and n is 1 or 2.

9. The apparatus of claim 8 wherein A and B are the same.

10. The apparatus of claim 8 wherein A and B are different.

11. The apparatus of claim 8 wherein R is an alkoxy group and n=1.

12. The apparatus of claim 8 wherein R is a methoxy.

13. The compound of claim 1 wherein R is a methoxy.

* * * * *